United States Patent
Groves et al.

(10) Patent No.: US 9,938,894 B2
(45) Date of Patent: Apr. 10, 2018

(54) TURBOCHARGER WITH VARIABLE-VANE TURBINE NOZZLE HAVING A BYPASS MECHANISM INTEGRATED WITH THE VANES

(71) Applicant: Honeywell International Inc., Morristown, NJ (US)

(72) Inventors: Chris Groves, Vosges (FR); Damien Marsal, Golbey (FR); Stephane Sibille, Thaon-les-vosges (FR); Aurelien Tingaud, Thaon les vosges (FR); Alain Lombard, Vosges (FR)

(73) Assignee: Honeywell International Inc., Morris Plains, NJ (US)

( * ) Notice: Subject to any disclaimer, the term of this patent is extended or adjusted under 35 U.S.C. 154(b) by 400 days.

(21) Appl. No.: 14/705,083

(22) Filed: May 6, 2015

(65) Prior Publication Data
US 2016/0326951 A1  Nov. 10, 2016

(51) Int. Cl.
*F02D 23/00* (2006.01)
*F02B 33/44* (2006.01)
*F02B 37/24* (2006.01)
*F02B 33/40* (2006.01)
*F01D 17/10* (2006.01)
*F01D 17/16* (2006.01)

(52) U.S. Cl.
CPC ............ *F02B 37/24* (2013.01); *F01D 17/105* (2013.01); *F01D 17/165* (2013.01); *F02B 33/40* (2013.01); *F05D 2220/40* (2013.01); *F05D 2260/606* (2013.01); *Y02T 10/144* (2013.01)

(58) Field of Classification Search
CPC .......... F02B 37/24; F01D 9/041; F01D 9/042; F01D 9/02; F01D 9/04; F01D 9/026
See application file for complete search history.

(56) References Cited

U.S. PATENT DOCUMENTS

| 6,729,134 B2 | 5/2004 | Arnold et al. |
| 2003/0014972 A1 | 1/2003 | Arnold |

FOREIGN PATENT DOCUMENTS

| DE | 102011120880 A1 | 6/2013 |
| EP | 1433937 A1 | 6/2004 |
| GB | 2413830 A | 9/2005 |

*Primary Examiner* — Ngoc T Nguyen
(74) *Attorney, Agent, or Firm* — John C. James

(57) ABSTRACT

A turbocharger includes a variable turbine nozzle defined between a nozzle ring and a pipe flange, and having a plurality of circumferentially spaced vanes rotatably mounted on the nozzle ring such that the vanes are pivotable. Each vane includes an airfoil section and a disk section rigidly affixed to an end of the airfoil section, the disk section being disposed against a face of the pipe flange, each disk section having a plurality of perforations extending axially therethrough. The pipe flange has a corresponding number of holes for each disk section of the vanes, the holes being positioned such that as each vane is rotated the perforations in the disk sections and the holes in the pipe flange of the insert become aligned in some positions of the vanes, allowing exhaust gas to pass between the nozzle and a space on an opposite side of the pipe flange from the nozzle.

4 Claims, 8 Drawing Sheets

TURBOCHARGER WITH VARIABLE-VANE TURBINE NOZZLE HAVING A BYPASS MECHANISM INTEGRATED WITH THE VANES

BACKGROUND OF THE INVENTION

This application relates generally to turbochargers for internal combustion engines, and relates more particularly to exhaust gas-driven turbochargers having a variable vane assembly in the nozzle for the turbine in order to regulate exhaust gas flow into the turbine.

Exhaust gas-driven turbochargers employ a turbine to extract power from the stream of exhaust gas coming from an internal combustion engine and use that power to drive a compressor in order to boost the pressure of the air supplied to the cylinders. Because it is often desired to have control over the degree of boost, it is common to employ some type of variable geometry mechanism in the turbine for regulating the flow of exhaust gas to the turbine wheel. One type of variable geometry mechanism employs an array of movable vanes disposed in the turbine nozzle through which the exhaust gas is fed to the turbine wheel. The vanes can be pivoted about respective pivot axes so as to vary an effective flow area and flow direction for the exhaust gas stream into the turbine wheel.

In some such variable-vane assemblies, the vanes are pivotally mounted to a nozzle ring that forms one wall of the turbine nozzle. The opposite wall of the nozzle is sometimes formed by the turbine housing itself, or alternatively can be formed by a pipe or insert that is formed separately from the turbine housing and is mounted in the turbine housing. The present disclosure concerns primarily variable-vane assemblies of the latter type.

VNT turbochargers usually are aerodynamically dimensioned to allow the full engine exhaust flow to pass through the turbocharger turbine stage. In order to prevent overboost issues (excessive boost pressure and/or excessive turbocharger shaft speed) the turbine stage has to be made larger than required for the optimum operating condition.

SUMMARY OF THE DISCLOSURE

The present disclosure describes turbocharger variable-vane assemblies that have features for allowing exhaust gas to bypass the turbine wheel under high-flow conditions. The assemblies described herein combine the variable nozzle function of a VNT turbocharger with the bypass capability of a rotary bypass device in a single kinematic mechanism.

In accordance with one embodiment disclosed herein, a turbocharger comprises a compressor comprising a compressor housing and a compressor wheel disposed in the compressor housing, a turbine housing defining a bore extending axially through the turbine housing and defining an exhaust gas inlet and an annular volute that receives exhaust gas via the exhaust gas inlet, the volute extending circumferentially about the bore, and a turbine wheel disposed within the turbine housing and arranged for receiving exhaust gas from the volute and expanding the exhaust gas and discharging the exhaust gas into the bore, the compressor wheel and the turbine wheel being affixed to opposite ends of a shaft.

The turbine includes a turbine nozzle extending from the volute generally radially inwardly to the turbine wheel, the turbine nozzle being defined between a first wall and a second wall axially spaced from the first wall.

The turbocharger further comprises a variable-vane assembly comprising a fixed nozzle ring and a plurality of circumferentially spaced vanes rotatably mounted on the nozzle ring such that the vanes are each rotatable about respective vane pivot axes, the nozzle ring defining the first wall of the turbine nozzle. Each vane includes an airfoil section disposed in the nozzle and an axle rigidly attached to and protruding from a first end of the airfoil section adjacent the nozzle ring, the axle being received into a hole in the nozzle ring such that the axle is rotatable in the hole for pivoting of the vane.

A pipe or insert has a tubular pipe section sealingly received into the bore of the turbine housing and a pipe flange extending generally radially out from one end of the pipe section, the pipe flange forming the second wall of the turbine nozzle and being axially spaced from the nozzle ring such that the vanes extend between the nozzle ring and the pipe flange.

Each vane includes a disk section rigidly affixed to a second end of the airfoil section, the disk section being disposed against a face of the pipe flange of the insert. Each disk section has a plurality of perforations extending axially therethrough (i.e., in the direction of the vane pivot axis). The pipe flange of the insert has a corresponding number of holes for each disk section of the vanes, the holes being positioned such that as each vane is rotated, the perforations in the disk sections and the holes in the pipe flange of the insert become aligned. The positioning of the perforations and the holes is such that the two features become aligned only from approximately a mid-open position to a fully-open position of the vanes. This allows excessive gas flow to be accommodated by the turbine stage.

In one embodiment, when the disk section perforations and pipe flange holes are aligned, exhaust gas flows from the turbine housing volute through the aligned perforations and holes, from a side of the pipe flange opposite from the vanes, and proceeds into the turbine nozzle in a direction substantially orthogonal to the exhaust gas flow through the vanes. This disrupts the gas flow through the vanes and reduces the turbine stage efficiency, which in turn reduces the shaft speed and limits the boost pressure.

In another embodiment, there is an additional sealed shroud component attached between the pipe flange and the pipe section of the insert so as to form a substantially sealed chamber in communication with the holes in the pipe flange. The pipe section of the insert includes generally radial holes providing communication between the sealed chamber and the turbine housing bore downstream of the turbine wheel. Accordingly, when the disk section perforations and pipe flange holes are aligned, a portion of the exhaust gas flowing through the nozzle can proceed through the aligned perforations and holes into the sealed chamber, and then from the sealed chamber through the radial holes into the bore. This reduces the gas flow through the turbine wheel which, in turn, reduces the shaft speed and limits the boost pressure.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
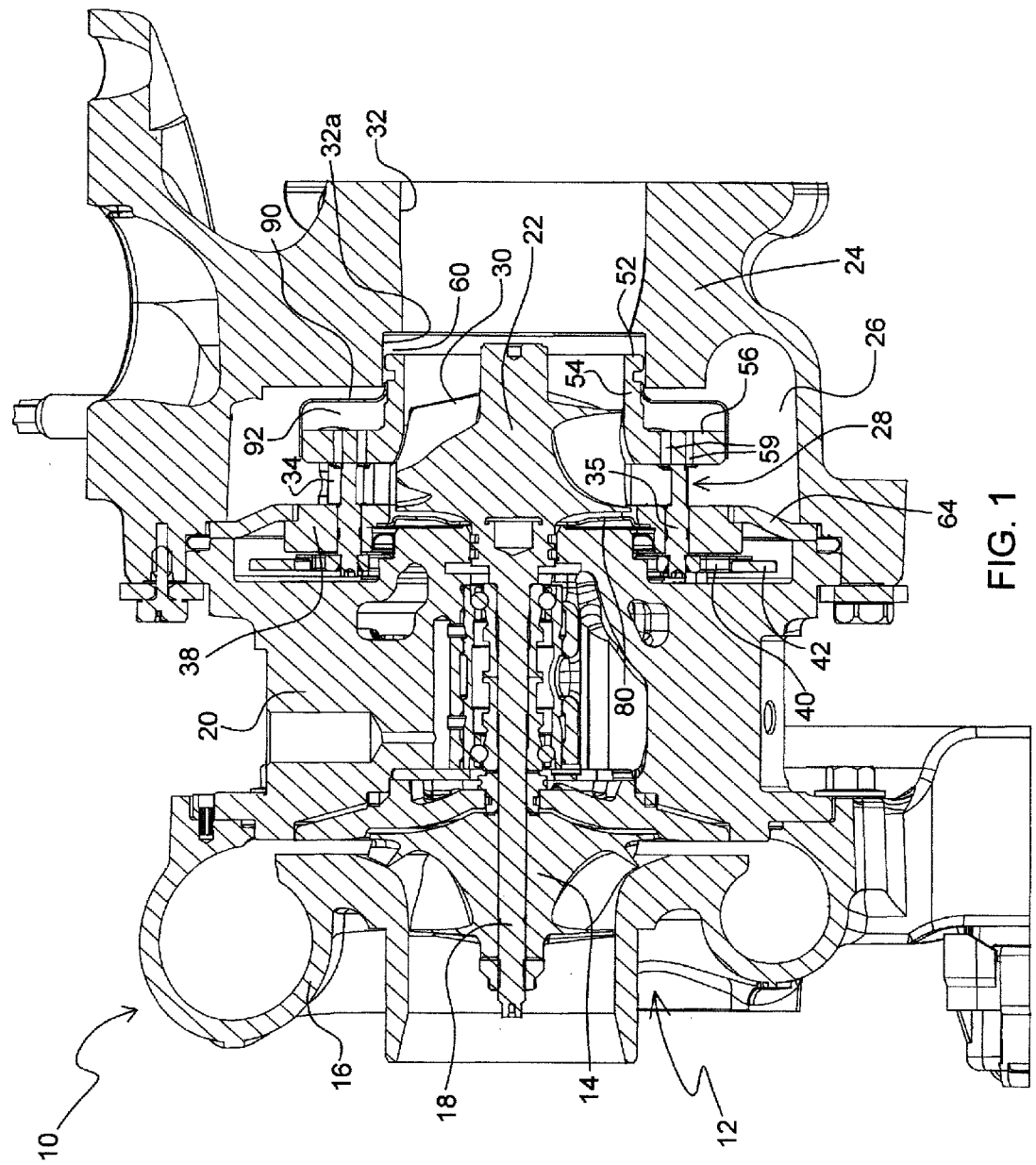
FIG. 1 is a cross-sectional view of a turbocharger in accordance with a first embodiment of the invention.

FIG. 1 illustrates a turbocharger 10 in accordance with one embodiment of the present invention. The turbocharger comprises a compressor 12 having a compressor wheel or impeller 14 mounted in a compressor housing 16 on one end of a rotatable shaft 18. The shaft is supported in bearings (not specifically illustrated) mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular volute 26 that surrounds the turbine wheel and that receives exhaust gas from the internal combustion engine for driving the turbine wheel. The exhaust gas is directed from the volute 26 generally radially inwardly through a turbine nozzle 28 to the turbine wheel 22. As the exhaust gas flows through the passages between the blades 30 of the turbine wheel, the gas is expanded to a lower pressure, and the gas discharged from the wheel exits the turbine housing through a generally axial bore 32 therein.

The turbine nozzle 28 is a variable nozzle for varying the cross-sectional flow area through the nozzle so as to regulate flow into the turbine wheel. The nozzle includes a plurality of vanes 34 that are circumferentially spaced about the nozzle. With reference to FIGS. 1 and 4A-C, each vane is affixed to an axle 35 that passes through an aperture in a generally annular nozzle ring 38 that is mounted coaxially with respect to the turbine wheel 22. Each axle 35 is rotatable about its axis for rotating the attached vane. The nozzle ring 38 forms one wall of the flow passage of the nozzle 28. Each of the axles has a vane arm 40 affixed to an end of the axle that protrudes out from the nozzle ring 38, and is engaged by a generally annular unison ring 42 (also referred to as an actuator ring) that is rotatable about its axis and that is coaxial with the nozzle ring 38. An actuator (not shown) is connected to the unison ring 42 for rotating it about its axis. When the unison ring 42 is rotated, the vane arms 40 are rotated to cause the axles 35 to rotate about their axes, thereby rotating the vanes 34 so as to vary the cross-sectional flow area through the nozzle 28.

In the illustrated embodiment, the variable vane mechanism is provided in the form of a cartridge 50 that is installable into and removable from the turbocharger as a unit. The cartridge 50, shown in isolation in FIG. 2, comprises the nozzle ring 38, vanes 34, axles 35, vane arms 40, and unison ring 42. The cartridge further comprises a pipe or insert 52 that has a pipe section 54 sealingly received into a portion 32a of the bore 32 of the turbine housing, and a pipe flange 56 extending generally radially out from one end of the pipe section 54, the pipe flange 56 being axially spaced from the nozzle ring 38 such that the vanes 34 extend between the nozzle ring 38 and the pipe flange 56. The bore portion 32a of the turbine housing has a radius that exceeds that of the remainder of the bore 32 by an amount slightly greater than the radial thickness of the pipe section 54 of the insert 52. The radially outer surface of the pipe section 54 has at least one circumferential groove, in which a sealing ring (not shown) is retained for sealingly engaging the inner surface of the bore portion 32a. Advantageously, the outer diameter of the pipe section 54 of the insert is slightly less than the inner diameter of the bore portion 32a so that a slight gap is defined therebetween, and only the sealing ring makes contact with the inner surface of the bore portion 32a. Additionally, there is a gap 60 between the end of the pipe section 54 and the adjacent end of the turbine housing at the end of the bore portion 32a. In this manner, the insert 52 is mechanically and thermally decoupled from the turbine housing 24.

Figure 2:
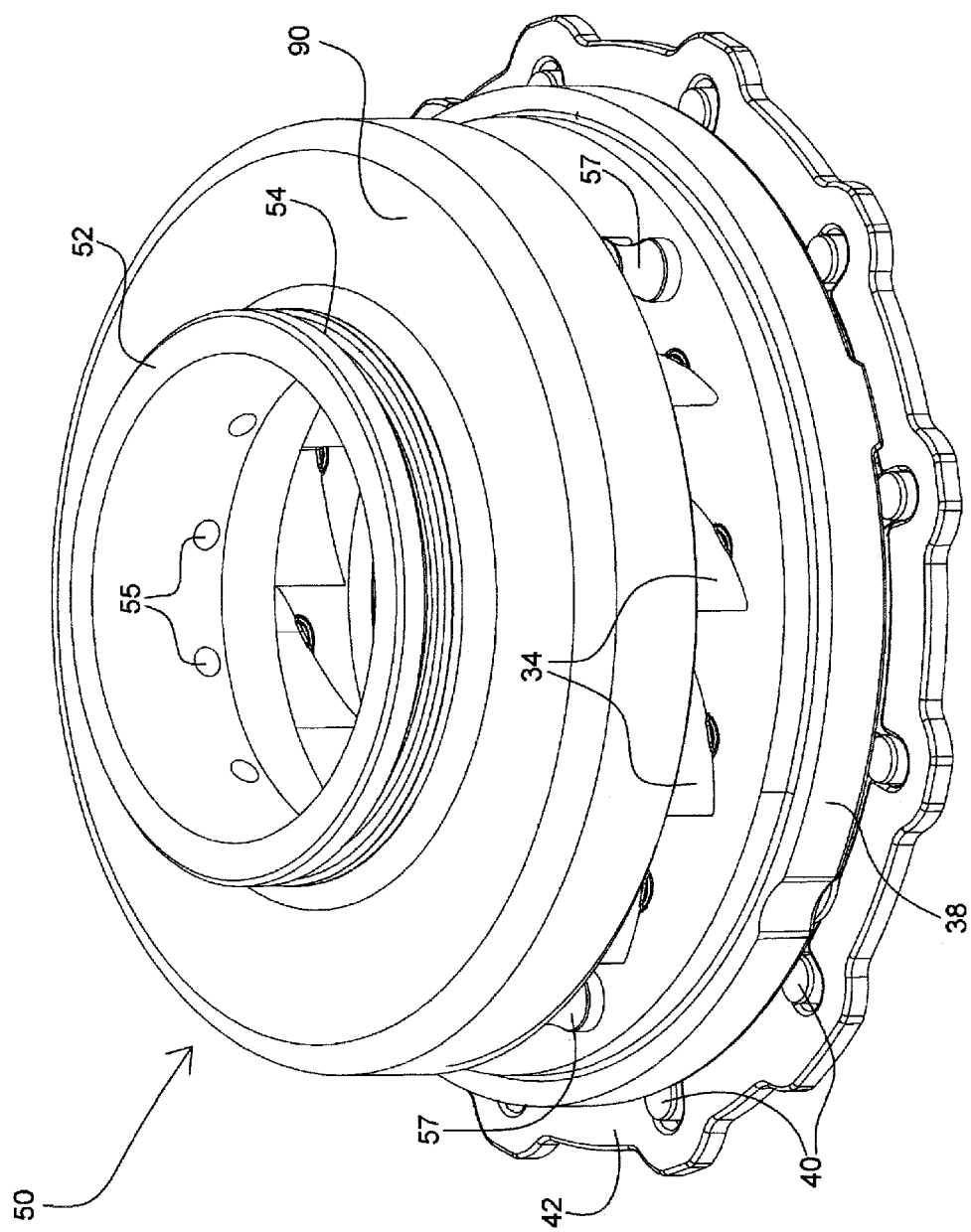
FIG. 2 is a perspective view of a variable-vane assembly used in the turbocharger of FIG. 1.
Figure 3:
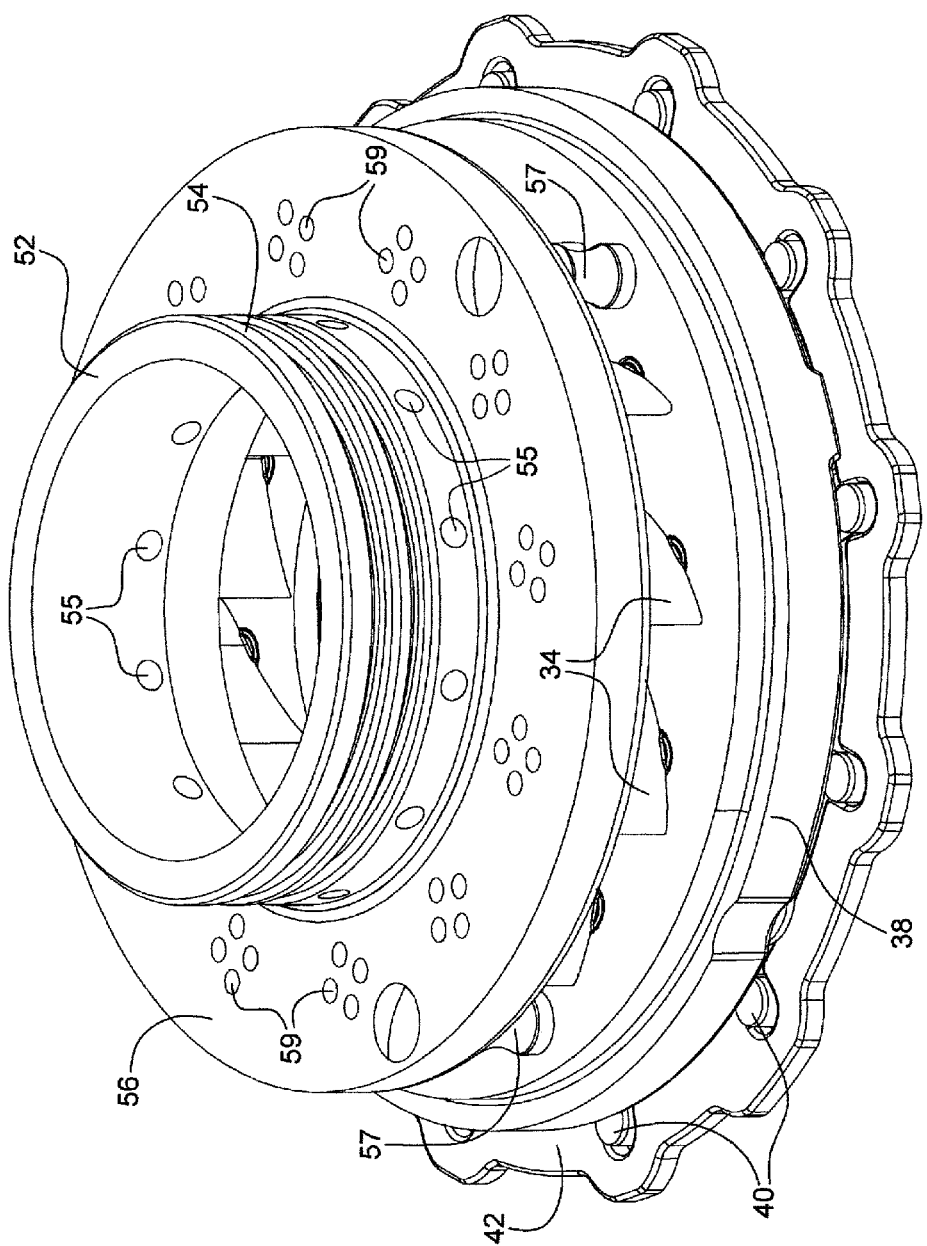
FIG. 3 is similar to FIG. 2, but with the shroud component removed from the variable-vane assembly to show internal details.

With further reference to FIG. 2, a plurality of spacers 57 are connected between the pipe flange of the insert 52 and the nozzle ring 38 for securing the nozzle ring to the insert and maintaining the desired axial spacing between the pipe flange of the insert and the nozzle ring. Advantageously, the spacers are formed of a material having good high-temperature mechanical properties and a relatively low thermal conductivity, such as stainless steel (e.g., grade 310 stainless steel) or the like, so that the nozzle ring 38 and insert 52 are effectively thermally decoupled from each other.

The variable-vane cartridge 50 also comprises a generally annular retainer ring 64 (FIG. 1) clamped between the center housing 20 and turbine housing 24. The retainer ring 64 is formed as a separate part from the insert 52 and is mechanically and thermally decoupled from the insert. More specifically, the retainer ring comprises an annular ring that at its radially inner side has an annular radially inwardly extending projection that engages the surface of the nozzle ring 38 facing toward the insert 52. The engagement between the projection and the nozzle ring 38 preferably is along a full 360° circumference of the nozzle ring so as to substantially seal the interface between the retainer ring and the nozzle ring and to assist the spacers in restraining the nozzle ring with respect to axial movement in the direction toward the insert 52. Advantageously, there is a radial gap between the inner periphery of the retainer ring and the opposing surface of the nozzle ring. This gap accommodates radial displacement of the nozzle ring relative to the retainer ring, such as may occur through differential thermal growth or other causes. Additionally, there is a radial gap between the outer periphery of the retainer ring and the opposing surface of the turbine housing.

The cartridge 50 further comprises a heat shroud 80 that is captively retained between the nozzle ring 38 and the center housing 20 when the cartridge is installed onto the center housing. The heat shroud 80 provides sealing between the nozzle ring and center housing to prevent hot exhaust gas from migrating between these parts into the cavity in which the vane arms 40 and unison ring 42 are disposed. The heat shroud 80 advantageously is a resiliently elastic material such as spring steel or the like, and the shroud is configured so that it is compressed in the axial direction between the nozzle ring 38 and the center housing 20 so that the restoring force of the shroud urges the shroud firmly against surfaces of the nozzle ring and center housing to substantially seal against these surfaces.

Figure 4:
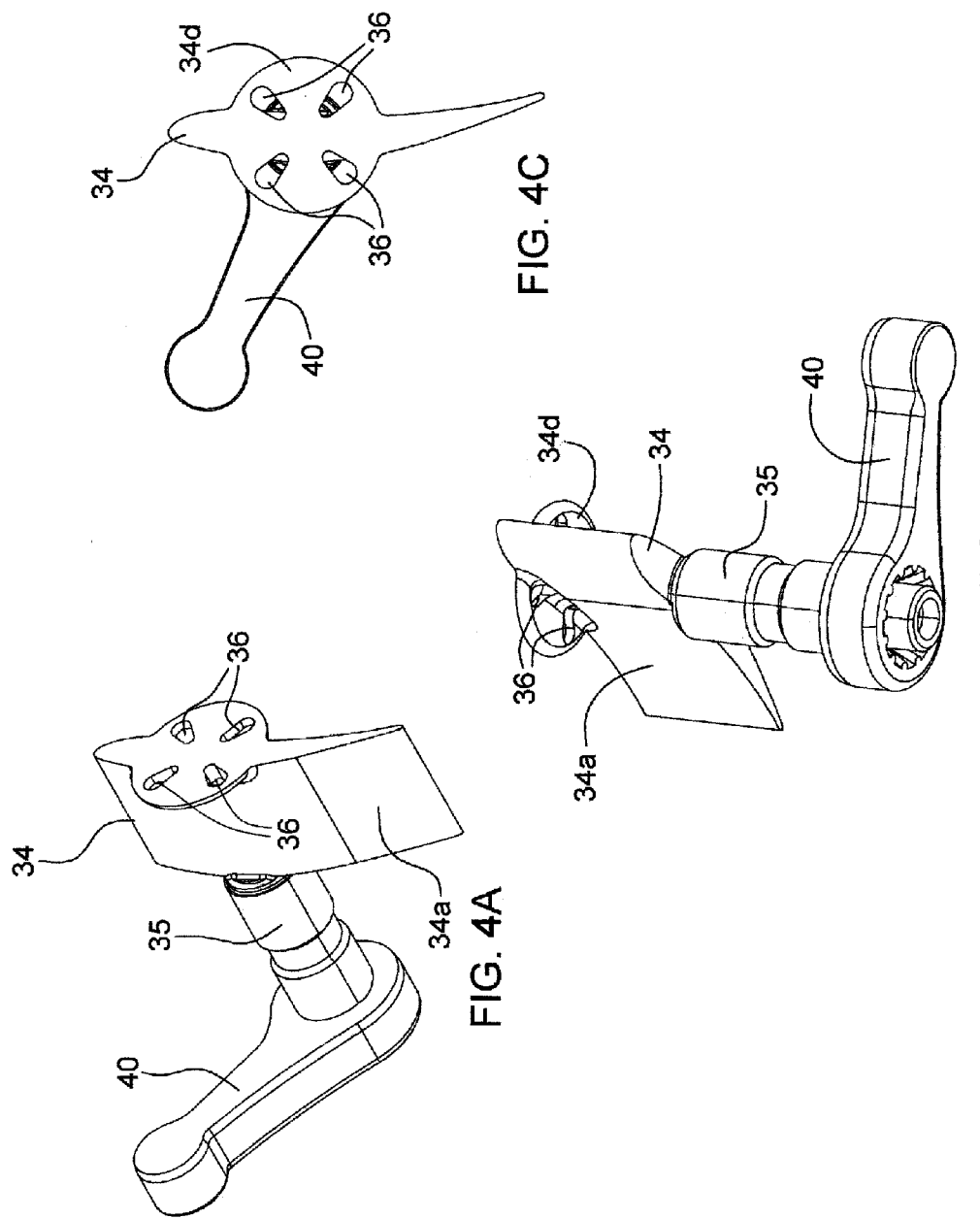
FIG. 4A is a perspective view of a vane, axle, and arm assembly used in the variable-vane assembly of FIG. 2.
FIG. 4B is another perspective view of the vane, axle, and arm assembly of FIG. 4A.
FIG. 4C is an end view of the vane, axle, and arm assembly of FIG. 4A.
Figure 5:
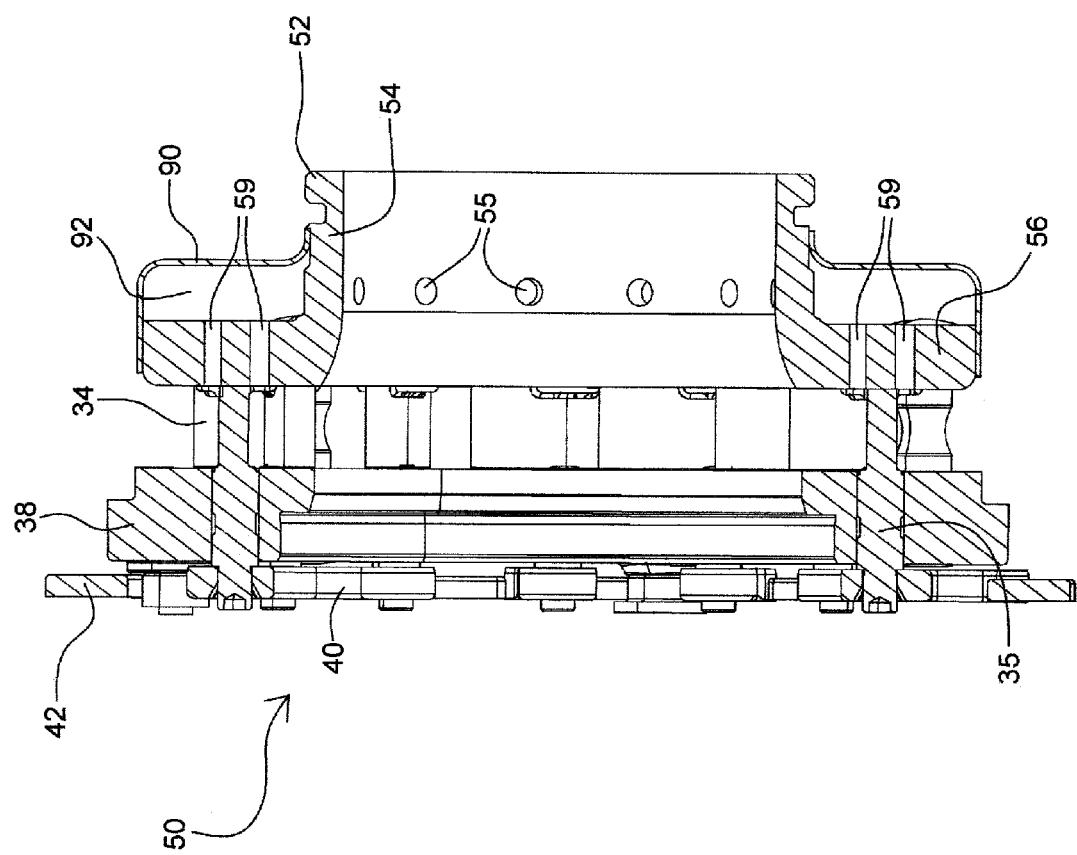
FIG. 5 is an axial cross-sectional view of the variable-vane assembly of FIG. 2.
Figure 6:
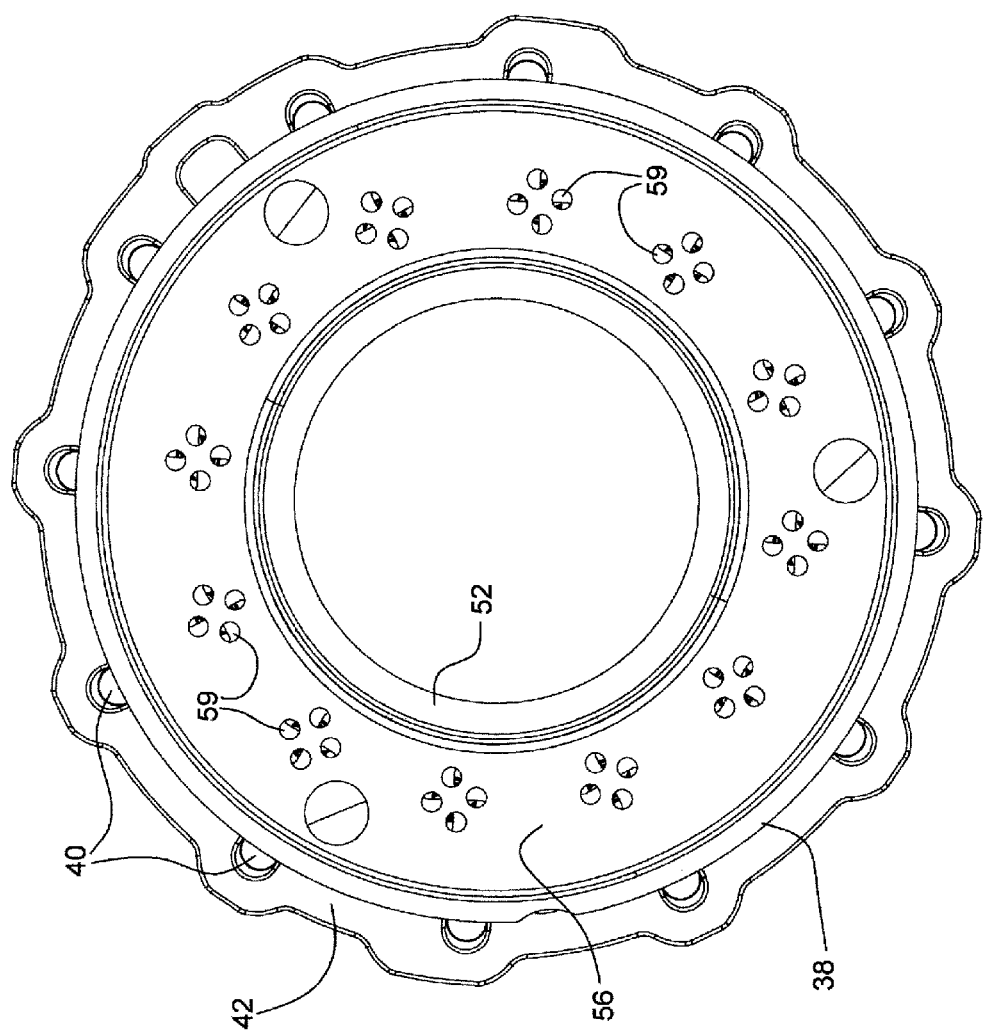
FIG. 6 is an axial end view of the variable-vane assembly of FIG. 2, but with the shroud component removed to show internal details.

With reference to FIGS. 2 through 5, and particularly to FIGS. 4A and 4B, each vane 34 includes an airfoil section 34a disposed in the turbine nozzle and an axle 35 rigidly attached to and protruding from a first end of the airfoil section 34a adjacent the nozzle ring 38. The axles are received respectively into holes in the nozzle ring 38 such that the axles are rotatable in the holes for pivoting of the vanes about the vane pivot axes. Each vane further includes a disk section 34d rigidly affixed to a second end of the airfoil section 34a, the disk section being disposed against a face of the pipe flange 56 of the insert. Each disk section has a plurality of perforations 36 extending axially therethrough. The pipe flange 56 of the insert has a corresponding number of holes 59 for each disk section 34d of the vanes. The holes 59 are positioned such that as the vanes 34 are rotated, the perforations 36 in the disk sections 34d and the holes 59 in the pipe flange 56 of the insert become aligned in some positions of the vanes, allowing exhaust gas to pass between the nozzle 28 and a space on an opposite side of the pipe flange 56 from the nozzle.

In particular, in the first embodiment of FIGS. 1-6, the variable-vane assembly includes an additional sealed shroud component 90 attached between the pipe flange 56 and the pipe section 54 of the insert so as to form a substantially sealed chamber 92 in communication with the holes 59 in the pipe flange. The pipe section 54 of the insert includes radial holes 55 providing communication between the sealed chamber 92 and the turbine housing bore 32 downstream of the turbine wheel 22. In the instant description and claims, the phrase "downstream of the turbine wheel" in reference to the radial holes 55 means that the holes 55 are situated downstream of the throat (i.e., the minimum-flow-area portion) of the turbine wheel. Thus, the holes 55 can be downstream of any part of the turbine wheel, or the holes can be positioned at the exducer of the wheel as in the illustrated embodiment (compare FIG. 1 with FIG. 5). When the disk section perforations 36 and pipe flange holes 59 are aligned, a portion of the exhaust gas flowing through the nozzle 28 can proceed through the aligned perforations and holes into the sealed chamber 92, and then from the sealed chamber through the radial holes 55 into the bore 32. This reduces the flow rate of exhaust gas through the turbine wheel, which in turn reduces the shaft speed and limits the boost pressure provided by the compressor of the turbocharger.

The perforations 36 and the holes 59 can be positioned such that the perforations become aligned with the holes only from approximately a mid-open position to a fully-open position of the vanes 34. The fully closed position of the vanes 34 corresponds to the minimum flow area through the nozzle 28, the fully open position corresponds to the maximum flow area through the nozzle, and the mid-open position is midway between the fully closed and fully open positions. Accordingly, when the vanes are between the fully closed and mid-open positions, substantially no exhaust gas bypasses the turbine wheel. As the vanes reach the mid-open position, some exhaust gas begins to bypass the turbine wheel, and at some point beyond the mid-open position the perforations and holes become fully aligned to maximize the bypass flow area available for the exhaust gas to bypass the turbine wheel.

Figure 7:
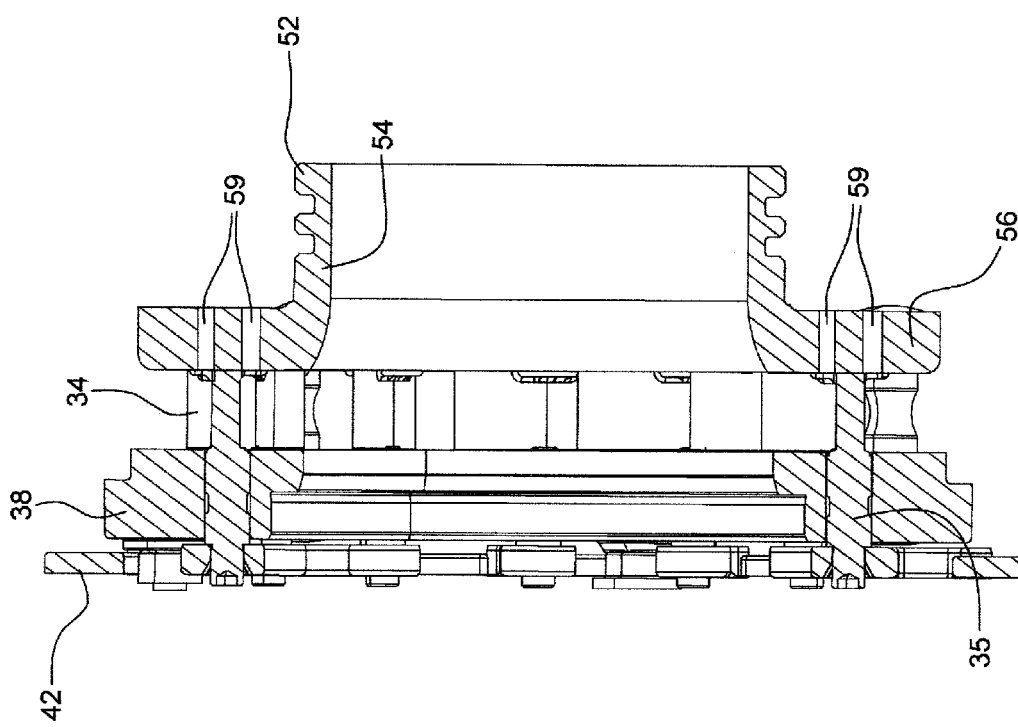
FIG. 7 is an axial-cross-sectional view of a variable-vane assembly in accordance with a second embodiment of the invention.
Figure 8:
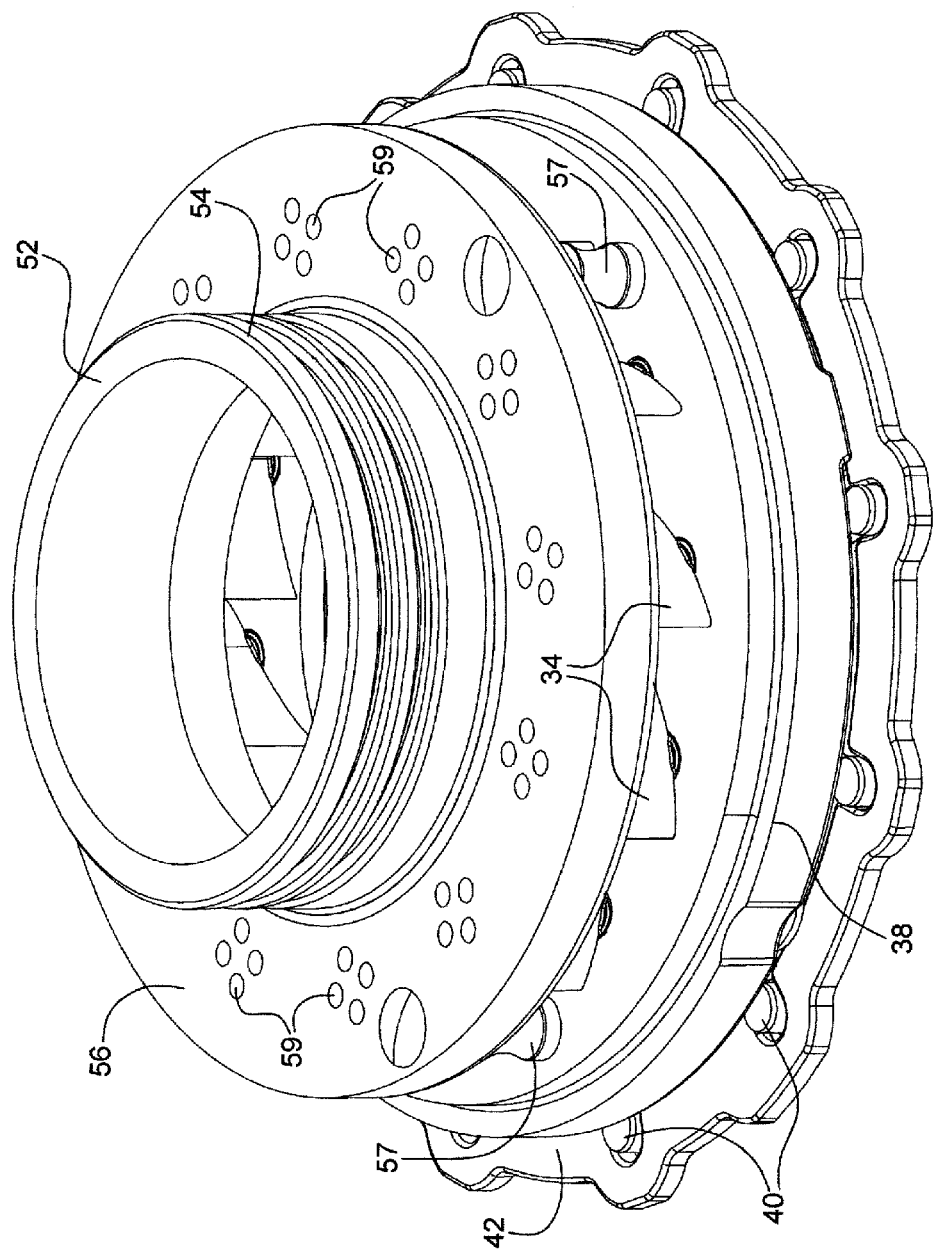
FIG. 8 is a perspective view of the variable-vane assembly in accordance with the second embodiment.

A second embodiment of the invention is illustrated in FIGS. 7 and 8. The second embodiment is substantially similar to the first embodiment, but operates in a different manner. Specifically, the direction of exhaust gas flow through the aligned perforations 36 and holes 59 is opposite from that of the first embodiment. This is because the shroud component 90 of the first embodiment is omitted in the second embodiment. Accordingly, the back side of the pipe flange 56 is exposed to exhaust gas in the turbine volute 26, and the exhaust gas at the back side of the pipe flange is substantially stagnated. As a result, the static pressure of the exhaust gas on the back side of the pipe flange 56 is higher than the static pressure of the exhaust gas on the nozzle side of the pipe flange, since the exhaust gas on the nozzle side is flowing through the nozzle 28 to the turbine wheel. Therefore, when the disk section perforations 36 become aligned with the pipe flange holes 59, exhaust gas flows from the turbine housing volute 26 through the aligned perforations and holes, from the back side of the pipe flange opposite from the nozzle, and proceeds into the nozzle 28 (right-to-left in FIG. 7) in a direction substantially orthogonal to the exhaust gas flowing through the vanes 34 so as to disrupt the flow through the vanes and thereby cause turbine stage efficiency to be reduced. This in turn reduces the shaft speed and limits the boost pressure provided by the compressor of the turbocharger.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A turbocharger comprising:
   a compressor comprising a compressor housing and a compressor wheel disposed in the compressor housing;
   a turbine housing defining a bore extending axially through the turbine housing and defining an exhaust gas inlet and an annular volute that receives exhaust gas via the exhaust gas inlet, the volute extending circumferentially about the bore, and a turbine wheel disposed within the turbine housing and arranged for receiving exhaust gas from the volute and expanding the exhaust gas and discharging the exhaust gas into the bore, the compressor wheel and the turbine wheel being affixed to opposite ends of a shaft;
   a turbine nozzle extending from the volute radially inwardly to the turbine wheel, the turbine nozzle being defined between a first wall and a second wall axially spaced from the first wall;
   a variable-vane assembly comprising a fixed nozzle ring and a plurality of circumferentially spaced vanes rotatably mounted on the nozzle ring such that the vanes are each rotatable about respective vane pivot axes, the nozzle ring defining the first wall of the turbine nozzle, each vane including an airfoil section disposed in the nozzle and an axle rigidly attached to and protruding from a first end of the airfoil section adjacent the nozzle ring, the axles being received respectively into holes in the nozzle ring such that the axles are rotatable in the holes for pivoting of the vanes about the vane pivot axes;

an insert having a pipe section sealingly received into the bore of the turbine housing and a pipe flange extending radially out from one end of the pipe section, the pipe flange forming the second wall of the turbine nozzle and being axially spaced from the nozzle ring such that the vanes extend between the nozzle ring and the pipe flange;

wherein each vane includes a disk section rigidly affixed to a second end of the airfoil section, the disk section being disposed against a face of the pipe flange of the insert, each disk section having a plurality of perforations extending axially therethrough, the pipe flange of the insert having a corresponding number of holes for each disk section of the vanes, the holes being positioned such that as the vanes are rotated the perforations in the disk sections and the holes in the pipe flange of the insert become aligned in some positions of the vanes, allowing exhaust gas to pass between the nozzle and a space on an opposite side of the pipe flange from the nozzle.

2. The turbocharger of claim 1, wherein the perforations and the holes are positioned such that the perforations become aligned with the holes only from a mid-open position to a fully-open position of the vanes.

3. The turbocharger of claim 1, wherein when the perforations and holes are aligned, exhaust gas flows from the turbine housing volute through the aligned perforations and holes, from a side of the pipe flange opposite from the nozzle, and proceeds into the nozzle in a direction orthogonal to the exhaust gas flowing through the vanes so as to disrupt the flow through the vanes and thereby cause turbine stage efficiency to be reduced.

4. The turbocharger of claim 1, further comprising an additional sealed shroud component attached between the pipe flange and the pipe section of the insert so as to form a sealed chamber in communication with the holes in the pipe flange, the pipe section of the insert including communication holes providing communication between the sealed chamber and the turbine housing bore downstream of the turbine wheel, such that when the disk section perforations and pipe flange holes are aligned, a portion of the exhaust gas flowing through the nozzle can proceed through the aligned perforations and holes into the sealed chamber, and then from the sealed chamber through the communication holes into the bore.

* * * * *